Sept. 9, 1958

W. J. PAULI 2,851,510

SOLID BATTERY

Filed Nov. 30, 1955

INVENTOR
William J. Pauli

BY W. E. Thibodeau, A. W. Dew
and J. D. Edgerton ATTORNEYS

2,851,510

SOLID BATTERY

William J. Pauli, Washington, D. C.

Application November 30, 1955, Serial No. 550,221

1 Claim. (Cl. 136—103)

(Granted under Title 35, U. S. Code (1952), sec. 266)

The invention described herein may be manufactured and used by or for the Government for governmental purposes without the payment to me of any royalty thereon.

This invention relates to low-drain electrical cells or batteries. Batteries according to this invention use ion exchange resins instead of the conventional type electrolyte. They have exceptionally long shelf life, as the electrolyte is in a solid state. Because, in an ion exchange resin, all the current is carried by either the positive or the negative ions, no concentration polarization occurs.

An object of the invention is to provide a battery having long shelf life.

Other objects are to provide a battery with constant open circuit voltage, low internal resistance, and good low temperature operation.

Further objects of the invention are to achieve the above in a cheap and simple manner with a device that is sturdy and easy to manufacture.

The specific nature of the invention as well as other objects and advantages thereof will clearly appear from the following description and drawings in which.

Figure 1:
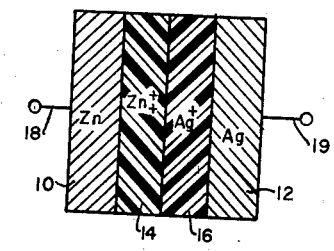
Fig. 1 is an enlarged cross sectional view of a first species of the cell of the invention.

In Fig. 1 the cell shown has two electrodes in the form of zinc plate 10 and silver plate 12 separated by membranes or sheets 14 and 16 of cation exchange resin. Terminal 18 is provided on plate 10 and terminal 19 is provided on plate 12. The cell is held together with some pressure. Cation exchange resins are well known and include sulfonated polystyrene, for example. Before assembly the hydrogen ions of sheet 14 have been replaced by zinc ions by any of various well known techniques— for example by soaking the sheet in a solution of a zinc salt. Sheet 16 has been similarly treated to replace its hydrogen ions with silver ions. Sheets 14 and 16 are hydrated with water or solvated with an organic liquid with a high dielectric constant such as glycerine or formamide.

When an electrical load is connected between electrodes 10 and 12 a current is generated by a process that involves zinc leaving electrode 10 to displace zinc ions in resin sheet 14. Zinc ions from sheet 14 simultaneously migrate to sheet 16, displacing silver ions; the silver ions from sheet 16 plate out on electrode 12.

Of course, other combinations of metals could be used for the electrodes 10 and 12, for example, magnesium and gold. In this species each resin sheet 14 and 16 has mobile ions of the metal it contacts.

The thickness of resin membranes or sheets 14 and 16 is not critical. Sheets of 0.025" thickness have been used successfully. The capacity of the battery is proportional to the thickness of the silver-replaced cation exchange resin sheet 16. The shelf life is related to the thickness of the zinc replaced sheet 14; the battery becomes inoperative when the mixing of silver ions in the zinc sheet reaches the surface of the zinc plate 10. The sheets 14 and 16 may be ion exchange resins in the pure state or may consist of particles of such resin in a suitable binder. A material is commercially available wherein particles of an ion exchange resin are embedded in the thermoplastic binder polyethylene. Solvent type binders may also be used. For example, particles of an ion exchange resin may be mixed with vinyl-chloride vinylidene-chloride copolymer dissolved in toluene and this mixture spread on a plate for the toluene to evaporate.

Figure 6:
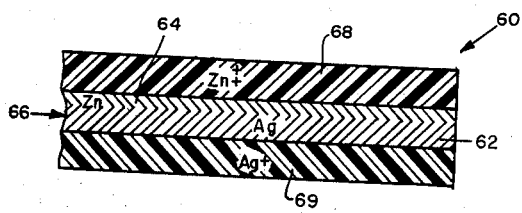
Fig. 6 is an enlarged fragmentary view in cross section illustrating the construction of the cell as incorporated in a battery.
Figure 7:
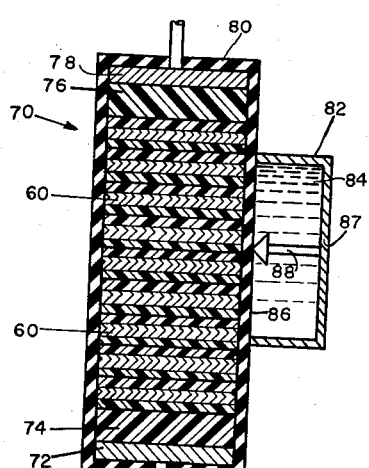
Fig. 7 is an enlarged cross sectional view of a battery employing the cells of the invention.

Figs. 6 and 7 show the construction of a battery incorporating cells using ion exchange resins. A basic element strip 60 is prepared by plating a silver ribbon 62 on one side with zinc 64 forming a bimetal strip 66. On the zinc-plated side 64 an ion exchange resin 68 with a mobile zinc ion is applied. On the silver side of strip 66 a resin 69 with a mobile silver ion is applied. Good resin-to-metal bonds are readily obtained. The battery 70 is then stacked by starting with a plate of zinc 72, followed by a sheet 74 of resin with a mobile zinc ion followed by several pads cut or punched from strip 60. The battery 70 may be stacked by punching the strip 60 directly over the battery as it builds up. The stack is topped with a sheet of resin 76 with a mobile silver ion and silver plate 78.

The bottom and top single metal plates 72, 78, and associated sheets of resin material 74, 76, may be eliminated and electrical contact made to the top and bottom bimetal strip 66. The extreme top and bottom bonded sheets of resin 68, 69, would be surplusage but left on for uniformity in mass production.

The shelf life of the battery 70 can be increased by hermetically sealing it in a case 80 while resin sheets 68 and 69 are dry. The case 80 is evacuated. A container 82, made of a flexible material, is attached to the side of case 80. Container 82 is filled with a wetting material 84, either water or an organic liquid as previously mentioned. When the battery is to be activated, the wall 86 between the case and the container 82 is ruptured by applying pressure through the flexible wall 87 of container 82 to a mechanical stabber 88. The wetting material 84 in container 82 then rushes into the vacuum of case 80, quickly wetting the resin sheets 68 and 69 and actuating the battery.

Figure 2:
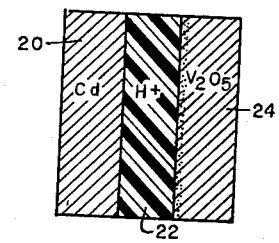
Fig. 2 is an enlarged cross sectional view of a second species of the cell.

Fig. 2 shows a variation wherein a cell comprises a cadmium plate 20, a single resin sheet 22 and an oxide plate 24. The resin sheet 22 has a mobile hydrogen ion. The oxide plate 24 may, for example, be nickel with an oxidized surface or vanadium with a surface of vanadium pentoxide. The action is that cadmium from plate 20 replaces hydrogen in the resin at the junction of plate 20 and sheet 22. At the junction of sheet 22 and plate 24 the hydrogen combines with the oxygen to form water.

Figure 3:
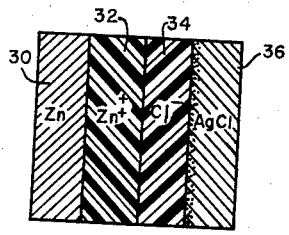
Fig. 3 is an enlarged cross sectional view of a third species of the cell.

Another variation shown in Fig. 3 uses a zinc plate 30, resin sheets 32 and 34, and a silver chloride plate 36. The sheet 32 is a cation exchange resin with zinc as the mobile ion, and sheet 34 is an anion exchange resin containing exchangeable chlorine ions. Plate 36 is a silver plate with a chlorized surface. The action is that plate 30 releases zinc ions to resin sheet 32 while plate 36 releases chloride ions to sheet 34. At the junction of sheets 32 and 34 the ions combine to form soluble zinc chloride.

Figure 4:
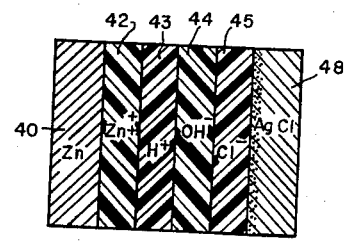
Fig. 4 is an enlarged cross sectional view of a modification of the third species.

In another modification shown in Fig. 4, a zinc plate 40, four resin sheets 42, 43, 44 and 45, and a silver chloride plate 48 are stacked in series. Sheet 42 has mobile zinc ions; 43, hydrogen ions; 44, hydroxyl ions; and 45, chloride ions. The action is that zinc ions migrate from zinc plate 40 to the face of sheet 43 where they displace hydrogen ions. Likewise, chlorine ions migrate from silver chloride plate 48 to the face of sheet 44 where they displace hydroxyl ions. At the junction of sheets 43 and 44 the hydrogen and hydroxyl ions unite to form water.

Figure 5:
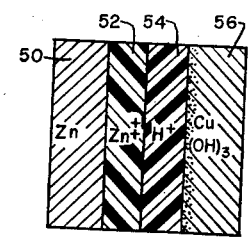
Fig. 5 is an enlarged cross sectional view of a fourth species of the cell.

Fig. 5 shows a cell with a zinc plate 50, resin sheets 52 and 54, and cuprous hydroxide plate 56. Sheet 52 has a mobile zinc ion and sheet 54 has a mobile hydrogen ion. Plate 56 is copper with a hydroxided surface. The action is that the migrating zinc ions displace the hydrogen ions in sheet 54. The hydrogen ions combine with hydroxyl ions at the face of plate 56 to form water.

It will be apparent that the embodiments shown are only exemplary and that various modifications can be made in materials, construction and arrangement within the scope of the invention as defined in the appended claim.

I claim:

A battery cell comprising in combination: first and second electrode plates, the first plate being zinc and the second plate being silver with a chlorized surface, and first, second, third, and fourth hydrated ion exchange resin sheets interposed between said plates, said first sheet having mobile zinc ions, said second sheet having mobile hydrogen ions, said third sheet having mobile hydroxyl ions, and said fourth sheet having mobile chloride ions, said first sheet having one side in contact with said zinc plate and the other side in contact with one side of said second sheet, said third sheet having one side in contact with the other side of said second sheet, said fourth sheet having one side in contact with the other side of said third sheet, the other side of said fourth sheet being in contact with the chlorized surface of said second plate.

References Cited in the file of this patent

UNITED STATES PATENTS

| | | |
|---|---|---|
| 2,166,179 | Ruben | July 18, 1939 |
| 2,403,567 | Wales | July 9, 1946 |
| 2,607,809 | Pitzer | Aug. 19, 1952 |
| 2,636,851 | Juda et al. | Apr. 28, 1953 |
| 2,696,513 | Lehovec | Dec. 7, 1954 |
| 2,700,063 | Manecke | Jan. 18, 1955 |
| 2,707,199 | Ruben | Apr. 26, 1955 |
| 2,747,009 | Kirkwood et al. | May 22, 1956 |
| 2,762,858 | Wood | Sept. 11, 1956 |